United States Patent
Steenstrup et al.

(10) Patent No.: US 11,054,521 B2
(45) Date of Patent: *Jul. 6, 2021

(54) HYPERSPECTRAL SONAR

(71) Applicant: R2SONIC, LLC, Austin, TX (US)

(72) Inventors: Jens Steenstrup, Austin, TX (US); Christopher Tiemann, Austin, TX (US); Peter Bilodeau, Austin, TX (US); Mark Chun, Austin, TX (US); Kirk Hobart, Austin, TX (US)

(73) Assignee: R2SONIC, LLC, Austin, TX (US)

( * ) Notice: Subject to any disclaimer, the term of this patent is extended or adjusted under 35 U.S.C. 154(b) by 478 days.

This patent is subject to a terminal disclaimer.

(21) Appl. No.: 16/118,327

(22) Filed: Aug. 30, 2018

(65) Prior Publication Data
US 2019/0079185 A1   Mar. 14, 2019

Related U.S. Application Data

(63) Continuation of application No. 15/700,482, filed on Sep. 11, 2017, now Pat. No. 10,067,228.

(51) Int. Cl.
| | | |
|---|---|---|
| *G01S 15/00* | (2020.01) | |
| *G01S 15/88* | (2006.01) | |
| *G01S 7/521* | (2006.01) | |
| *G06K 9/62* | (2006.01) | |
| *H04L 27/26* | (2006.01) | |
| *G06K 9/00* | (2006.01) | |
| *G01S 15/87* | (2006.01) | |
| *G01S 15/32* | (2006.01) | |
| *G01S 15/89* | (2006.01) | |
| *G01S 15/10* | (2006.01) | |
| *G01S 7/536* | (2006.01) | |

(52) U.S. Cl.
CPC .............. *G01S 15/88* (2013.01); *G01S 7/521* (2013.01); *G01S 7/536* (2013.01); *G01S 15/102* (2013.01); *G01S 15/32* (2013.01); *G01S 15/87* (2013.01); *G01S 15/89* (2013.01); *G06K 9/00496* (2013.01); *G06K 9/62* (2013.01); *H04L 27/2601* (2013.01)

(58) Field of Classification Search
USPC .......................................................... 367/87
See application file for complete search history.

(56) References Cited

U.S. PATENT DOCUMENTS

| | | | | |
|---|---|---|---|---|
| 3,114,631 A | * | 12/1963 | Sistare | ............... H01H 1/02374 148/431 |
| 3,144,631 A | | 8/1964 | Lustig et al. | |
| 3,488,445 A | | 1/1970 | Chang | |
| 4,953,143 A | * | 8/1990 | Higgins | ................ G01S 15/102 367/88 |
| 5,377,163 A | | 12/1994 | Simpson | |
| 5,422,860 A | * | 6/1995 | Bradley | ................ G01S 15/104 367/89 |
| 5,483,499 A | * | 1/1996 | Brumley | ................ G01S 15/582 367/89 |
| 6,285,628 B1 | | 9/2001 | Kiesel | |

(Continued)

*Primary Examiner* — James R Hulka
(74) *Attorney, Agent, or Firm* — Paul D. Chancellor; Ocean Law

(57) ABSTRACT

A sonar survey system and method excites reflectors using a broadband message that excites all frequencies within the band providing for selection and evaluation of frequencies of interest after the survey is completed.

20 Claims, 14 Drawing Sheets

(56) References Cited

U.S. PATENT DOCUMENTS

| | | | |
|---|---|---|---|
| 6,714,482 B2* | 3/2004 | Rowe | G01F 1/002 367/90 |
| 7,092,440 B1* | 8/2006 | Dress, Jr. | H04B 1/692 332/103 |
| 7,355,924 B2* | 4/2008 | Zimmerman | G01S 7/52003 367/131 |
| 7,929,375 B2 | 4/2011 | Nuttall et al. | |
| 8,107,320 B2* | 1/2012 | Novick | G01S 3/8006 367/118 |
| 8,130,592 B2* | 3/2012 | Scoca | G01S 15/60 367/89 |
| 8,220,408 B2* | 7/2012 | Stone | B63C 11/42 114/312 |
| 8,248,298 B2* | 8/2012 | Lalezari | H01Q 21/24 342/120 |
| 8,305,841 B2 | 11/2012 | Riordan et al. | |
| 8,514,658 B2* | 8/2013 | Maguire | G01S 15/89 367/88 |
| 8,605,550 B2* | 12/2013 | Maguire | G01S 15/89 367/88 |
| 8,625,392 B2* | 1/2014 | Brumley | G01H 5/00 367/127 |
| 9,091,790 B2* | 7/2015 | Caute | G01S 7/003 |
| 9,192,353 B2* | 11/2015 | Bandy | A61B 5/6861 |
| 9,214,149 B2* | 12/2015 | Barnard | G10K 11/006 |
| 9,223,022 B2* | 12/2015 | Coleman | G01S 15/87 |
| 9,244,168 B2* | 1/2016 | Proctor | G01S 15/8902 |
| 9,268,020 B2* | 2/2016 | Coleman | G01S 7/521 |
| 9,354,312 B2* | 5/2016 | Proctor | G01S 15/8902 |
| 9,384,447 B2 | 7/2016 | Forero et al. | |
| 9,541,643 B2* | 1/2017 | Maguire | G01S 15/89 |
| 9,772,416 B2* | 9/2017 | Caute | G01S 7/003 |
| 9,772,417 B2* | 9/2017 | Caute | G01S 7/003 |
| 9,817,116 B1* | 11/2017 | Steenstrup | G01S 7/282 |
| 9,817,117 B1* | 11/2017 | Steenstrup | G01S 15/89 |
| 10,067,228 B1* | 9/2018 | Steenstrup | G01S 7/536 |
| 10,094,924 B2* | 10/2018 | Steenstrup | G01S 15/89 |
| 10,132,924 B2* | 11/2018 | Steenstrup | G01S 15/89 |
| 10,429,505 B2* | 10/2019 | Steenstrup | G01S 15/89 |
| 2002/0126577 A1* | 9/2002 | Borchardt | G01S 15/87 367/88 |
| 2003/0076742 A1* | 4/2003 | Rowe | G01F 1/002 367/89 |
| 2003/0235112 A1* | 12/2003 | Zimmerman | G01S 7/521 367/4 |
| 2007/0025183 A1* | 2/2007 | Zimmerman | G01S 7/52003 367/88 |
| 2007/0159922 A1* | 7/2007 | Zimmerman | G01S 7/52004 367/103 |
| 2009/0031940 A1* | 2/2009 | Stone | B63C 11/42 114/330 |
| 2009/0257312 A1* | 10/2009 | Novick | G01S 3/8006 367/119 |
| 2010/0141527 A1* | 6/2010 | Lalezari | H01Q 21/08 342/368 |
| 2010/0157736 A1* | 6/2010 | Riordan | G01S 15/87 367/88 |
| 2010/0302907 A1* | 12/2010 | Brumley | G01H 5/00 367/89 |
| 2011/0007606 A1* | 1/2011 | Curtis | G01S 15/04 367/103 |
| 2011/0182146 A1* | 7/2011 | Scoca | G01S 13/605 367/89 |
| 2011/0202278 A1 | 8/2011 | Caute et al. | |
| 2011/0237951 A1* | 9/2011 | Bandy | A61B 5/6861 600/459 |
| 2012/0106300 A1* | 5/2012 | Maguire | G01S 15/89 367/153 |
| 2013/0021876 A1* | 1/2013 | Maguire | G01S 15/89 367/88 |
| 2013/0033969 A1* | 2/2013 | Barnard | G01S 1/72 367/149 |
| 2013/0170320 A1* | 7/2013 | Brumley | G01H 5/00 367/127 |
| 2013/0208568 A1* | 8/2013 | Coleman | G01S 7/521 367/88 |
| 2014/0010048 A1* | 1/2014 | Proctor | G01S 15/8902 367/88 |
| 2015/0253425 A1* | 9/2015 | Coleman | G01S 15/87 367/7 |
| 2015/0331104 A1* | 11/2015 | Proctor | G01S 15/8902 367/88 |
| 2016/0011326 A1* | 1/2016 | Caute | G01S 7/003 367/87 |
| 2016/0216392 A1* | 7/2016 | Caute | G01S 7/003 |
| 2017/0315234 A1* | 11/2017 | Steenstrup | G01S 7/282 |
| 2017/0315235 A1* | 11/2017 | Steenstrup | G01S 15/89 |
| 2017/0315236 A1* | 11/2017 | Steenstrup | G01S 15/89 |
| 2017/0315237 A1* | 11/2017 | Steenstrup | G01S 15/8902 |
| 2018/0067208 A1* | 3/2018 | Steenstrup | G01S 7/282 |
| 2018/0136329 A1* | 5/2018 | Steenstrup | G01S 15/89 |
| 2019/0004174 A1* | 1/2019 | Steenstrup | G01S 7/53 |
| 2019/0011553 A1* | 1/2019 | Steenstrup | G01S 15/89 |
| 2019/0079185 A1* | 3/2019 | Steenstrup | G01S 15/102 |
| 2019/0154827 A1* | 5/2019 | Steenstrup | G01S 15/89 |

* cited by examiner

| HYPERSPECTRAL MISSION | SIGNAL TYPE | | | |
|---|---|---|---|---|
| | FM | Noise-like | Click | Click Train |
| 1) Bottom classification and/or segmentation | X | X | X | X |
| 2) Sub-bottom classification and/or segmentation | X | X | X | X |
| 3) Improved bottom detection | X | X | X | X |
| 4) Water column classification and/or segmentation | X | X | X | X |
| 5) Object classification | X | X | X | X |

HYPERSPECTRAL SONAR

PRIORITY APPLICATIONS AND INCORPORATION BY REFERENCE

This application is a continuation of Ser. No. 15/700,482 filed Sep. 11, 2017 entitled Hyperspectral Sonar. This application incorporates by reference, in their entireties and for all purposes, the disclosures of U.S. Pat. No. 3,144,631 concerning Mills Cross sonar, U.S. Pat. No. 8,305,841 concerning sonar used for mapping seafloor topography and U.S. Pat. No. 3,488,445 concerning matched filtering of orthogonal signals.

BACKGROUND OF THE INVENTION

Field of the Invention

The present invention relates to underwater acoustical systems, methods for using underwater acoustical systems, and methods for processing and using the data they produce. In particular, the invention relates to hyperspectral survey systems.

Discussion of the Related Art

Sonar survey systems that operate at one or at a few frequencies are known in applications including bathymetric surveys and bottom classification. However, although broadband survey systems can also be used for bathymetric surveys, their use for sea floor and water column classification are generally unknown.

SUMMARY OF THE INVENTION

The present invention provides a hyperspectral sonar system. With goals similar to bottom characterization and water column characterization missions, hyperspectral sonar uses substantially different transmit waveforms, beamforming, and post-processing methods to acquire data across a broad spectrum of frequencies.

Hyperspectral operation can be contrasted with multi-spectral techniques. In the one, multi-spectral, acoustic data are acquired at particular frequencies such that results are available only at those frequencies in use during the original data acquisition. Frequencies of interest to the user must be known and chosen ahead of time prior to data collection. In the other, hyperspectral, data are acquired across a broad frequency range. Contemporaneous or post processed hyperspectral data therefore provide results at any frequencies of interest up to the Nyquist frequency of the system with a frequency resolution of 1/acquisition time. Compared to the multi-spectral case, hyperspectral techniques offer higher frequency resolution when collecting frequency-dependent results and provide the user flexibility in choosing frequencies of interest in post-processing; no prior knowledge is required.

Like the multi-spectral system, the minimum and maximum operating frequencies of a hyperspectral system are determined by the operating band of the sonar. However, unlike multi-spectral systems that utilize multiple sonar systems for transmitting multiple waveforms, hyperspectral sonar has no such requirement; a single hyperspectral system will suffice. Furthermore, no library of transmit waveforms with different center frequencies is required since one broadband waveform may substitute for all.

Applicant notes that some known sonar systems may utilize broadband signals. However, these systems do not operate like applicant's hyperspectral sonar system. For example, these systems may have one or more of the following characteristics which distinguish them from embodiments of applicant's invention:
- operate at low frequencies less than 20 kHz;
- have a relatively small bandwidth spanning less than a decade of frequencies;
- be single beam systems with one broad beam of around 10 degrees beamwidth in one dimension;
- be oriented such that beam(s) are horizontal;
- use pulse compression or matched filtering techniques; and
- classify targets based on resonance.

Take, for example, broadband sonar systems used in fishing applications. Such systems possess many of the above qualities and are incompatible with applicant's hyperspectral sonar system. A fisheries sonar typically uses a wide beam to integrate the combined backscatter over a large volume of water for estimating total biomass in the volume, and interpretation of the local minima and maxima of the returned spectrum allows for species estimation based on known resonances of fish. To contrast, a hyperspectral system focuses a very narrow beam (for example, 1°×1° beamwidth) on discrete targets, making it impractical for integrations over large volumes. Hyperspectral systems also exclude matched filters and examine echo content at only specific frequencies of interest.

In an embodiment, applicant's survey system provides: a vertical survey system including a broadband multibeam echo sounder system that avoids the use of matched filters for installation on a water going vehicle; an acoustic transceiver for use with one or more transducers in a single projector array and plural transducers in a single hydrophone array; the projector array arranged with respect to the hydrophone array to form a Mills Cross; the system capable of forming beams with 1°×1° or better resolution; a transceiver for synthesizing a transmitter message including a frequency modulated (FM), noise-like, click, or click train message with a frequency between 20 and 1000 kHz and with a bandwidth of 100 kHz or more; and, the message for exciting the projector array such that a 180 degree or smaller swath of a waterbody bottom is ensonified by the message, and a message echo from ensonified scattering centers is returned to the hydrophone array; wherein data derived from the hydrophone returns are stored and subsequently made available for analysis of any frequency within the band using narrow band pass filters or spectral analysis and comparison of the results from any two or more frequencies.

In an embodiment, applicant's survey system provides: A method of comparing band pass filter outputs to assess the strength of echo returns at particular frequencies, the method comprising the steps of acquiring multibeam sonar data and indexing the data by ping number, beam number, and sample number; storing the sonar data; selecting a ping and selecting a beam of the ping; processing one beam at a time by identifying a time series associated with the beam, using no matched filters, selecting a band pass filter centered at a discrete frequency $f_i$ where the selected band pass filter frequency need not match the frequency of the transmitted waveform, processing the time series through a band pass filter centered at discrete frequency $f_1$, and repeating the processing step for n frequencies where n is two or more; and, comparing the band pass filter outputs at two or more band pass filter frequencies.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

DETAILED DESCRIPTION OF THE PREFERRED EMBODIMENTS

The disclosure provided in the following pages describes examples of some embodiments of the invention. The designs, figures, and description are non-limiting examples of the embodiments they disclose. For example, other embodiments of the disclosed device and/or method may or may not include the features described herein. Moreover, described features, advantages or benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

Frequency Dependence of Sonar Returns

Figure 1:
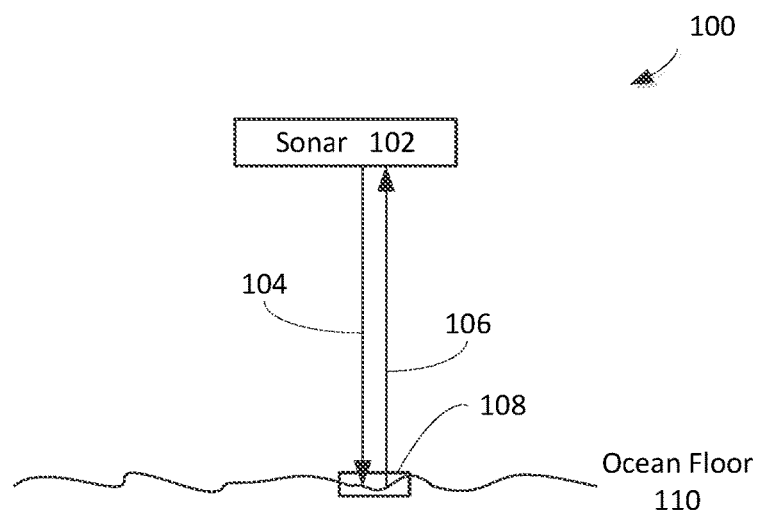
FIG. 1 shows a sonar system of the present invention 100.

FIG. 1 shows a sonar system 102 that ensonifies a location on an ocean floor 108. The sonar system 102 emits an acoustic signal or message 104 from projector transducers and the signal strikes scattering centers or reflectors 108 at the ocean floor 110. Returns from the acoustic interaction 106 are received by hydrophone transducers 107 at the sonar 102.

The acoustic interaction between the emitted signal and the reflector produces a return that depends on a number of variables including angle of incidence and frequency of the emitted signal. For example, when the survey system is directly over the reflector the backscatter strength may be a maximum with lesser angles of incidence having less backscatter strength.

Seabed conditions may be of interest. In the case of varying frequency, at low frequencies where acoustic wavelengths are larger than the scale of seabed roughness, the seabed surface may appear to be acoustically smooth. On the other hand, at high frequencies such that acoustic wavelengths are smaller than the scale of seabed roughness, scattering can dominate the returning signal and the seabed may be considered acoustically rough. Water column conditions may be of interest. Here, low frequencies with large acoustic wavelengths may be required to match the scale of water column features. At this scale, water column features such as fish come to mind. Where water column features such as particulate, small bubbles, and plankton are of interest, higher frequencies with smaller acoustic wavelengths may be required to match the scale of the feature.

Where conditions of the ocean bottom or water column suggest that the response of reflectors to disparate frequencies will be different owing for example to differing hardness (acoustic reflection coefficient), roughness (as a backscatter coefficient) or scale of an obstruction, multispectral sonar systems may be used to distinguish among types of bottoms or water column obstructions encountered.

Multispectral Sonar Systems

Figure 2A:
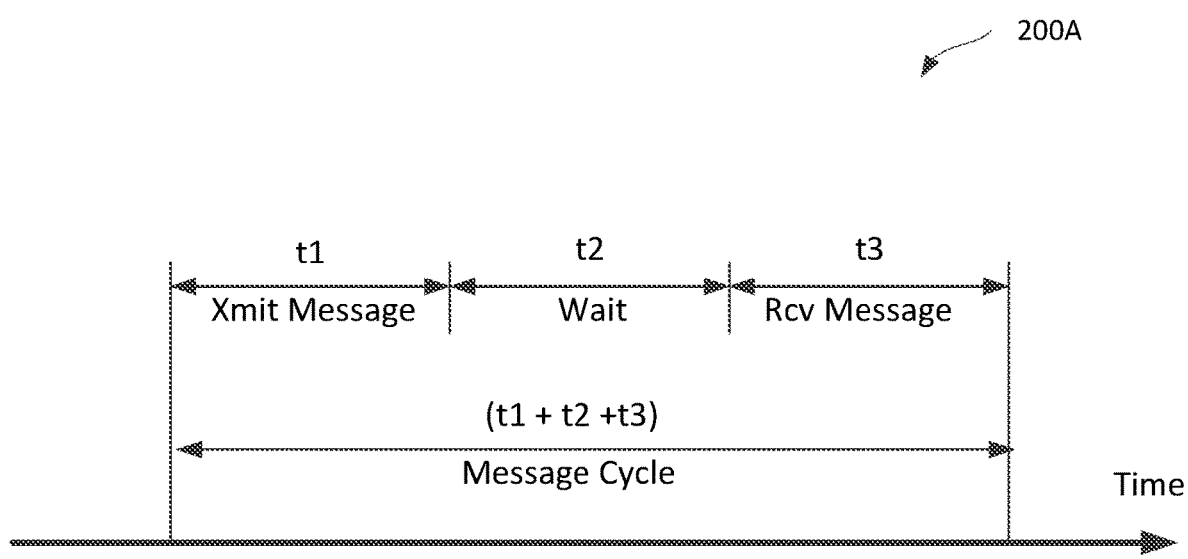
FIG. 2A shows a message timing diagram 200A.

FIG. 2A shows a message cycle 200A. In particular, the sonar system emits a single ping acoustic message during t1. And, during t3 the sonar system receives returns from the emitted message. Between these two times there is an optional wait time t2.

Figure 2B:
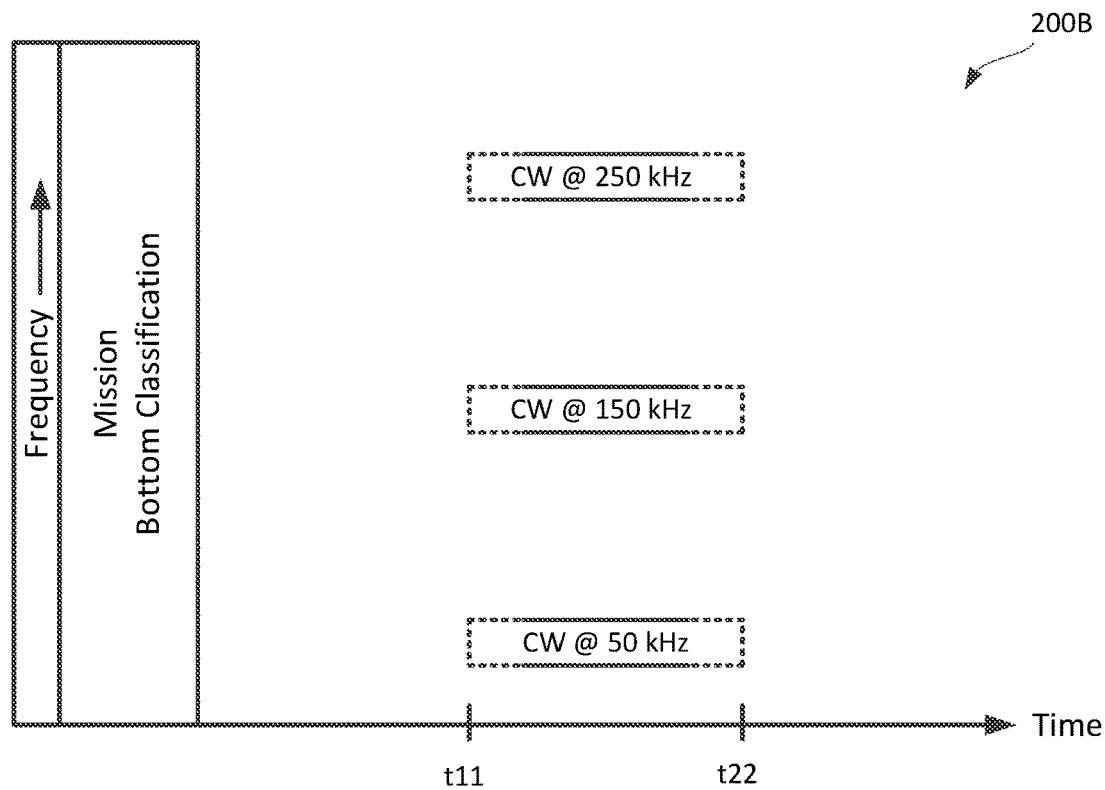
FIG. 2B-C show multispectral messages in parallel and serial format 200B-C.

FIG. 2B illustrates a multispectral sonar system that acquires multifrequency data 200B. In particular, three CW signals at widely spaced frequencies 50, 150, 250 kHz are included in a transmitted message. As shown, the signals are arranged to occur during the same time span t11-t22. Notably, in some embodiments the signals are of differing durations.

Figure 2C:
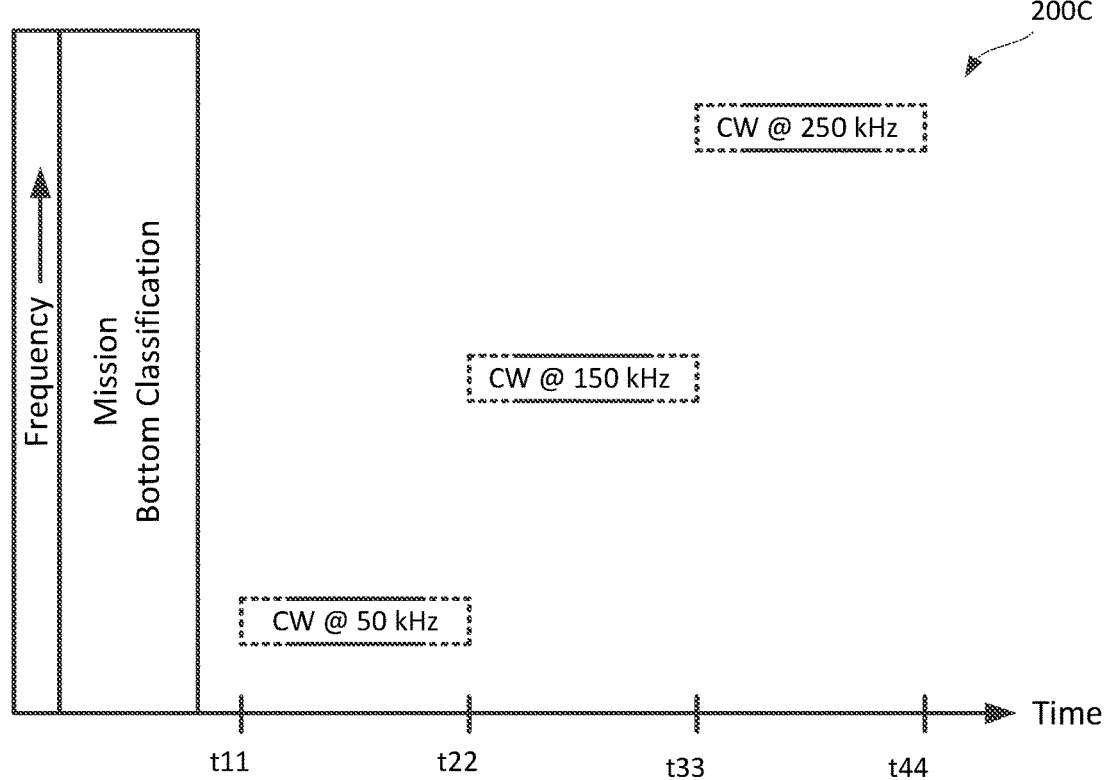

FIG. 2C illustrates a multispectral sonar system that acquires multifrequency data 200C. In particular, three CW signals at widely spaced frequencies 50, 150, 250 kHz are included in a transmitted message. As shown, the signals are arranged serially such that they occur in time spans t11-t22, t22-t33, and t33-t44. Notably, in some embodiments there are temporal gaps between the signals.

Sonar systems capable of constructing the messages of FIG. 2B-C, ensonifying a target with the message, and processing the returns include multispectral systems that operate at the three frequencies. These sonar systems must segregate the signals at the three frequencies, and bandpass filters or matched filters or their equivalents are typically used for this purpose.

Multispectral sonar systems such as those described above may be distinguished from hyperspectral sonar systems. In particular, hyperspectral sonar systems utilize a broadband signal to excite all frequencies within the band for ensonifying a target and have no need of segregating signals at various frequencies during transmission as was the case for multispectral sonar systems.

Broadband signals are contrasted with narrow band signals. In an embodiment, a signal is a broadband signal when it is not a narrow band signal.

In an embodiment, broadband signals occur in the range of 20 kHz to 1000 kHz and may have bandwidths in the range of 20 kHz to 1000 kHz.

In an embodiment, a signal is a broadband signal when it exceeds 20 kHz and its bandwidth is more than 10% of the center frequency.

In an embodiment, a signal is a broadband signal when a statistically significant difference exists between a) an acoustic return from a target excited by a first frequency in the band and b) an acoustic return from the target excited by a second frequency in the band.

In an embodiment, a signal is a broadband signal when the backscatter strength at first frequency in the band differs by more than a prescribed amount from the backscatter strength at a second frequency in the band. In some embodiments a difference of about 2 dB or more may indicate that the signal is a broadband signal. An example follows.

Consider a message comprising signals Sx in frequency bands Bx and By where Bx is the lower of the two frequency bands. Where backscatter signal strengths BSx and BSy differ by 2 dB or more, then the signal is a broadband signal.

Any one or more of the above described methods may be used to determine whether a signal is a broadband signal.

Figure 2D:
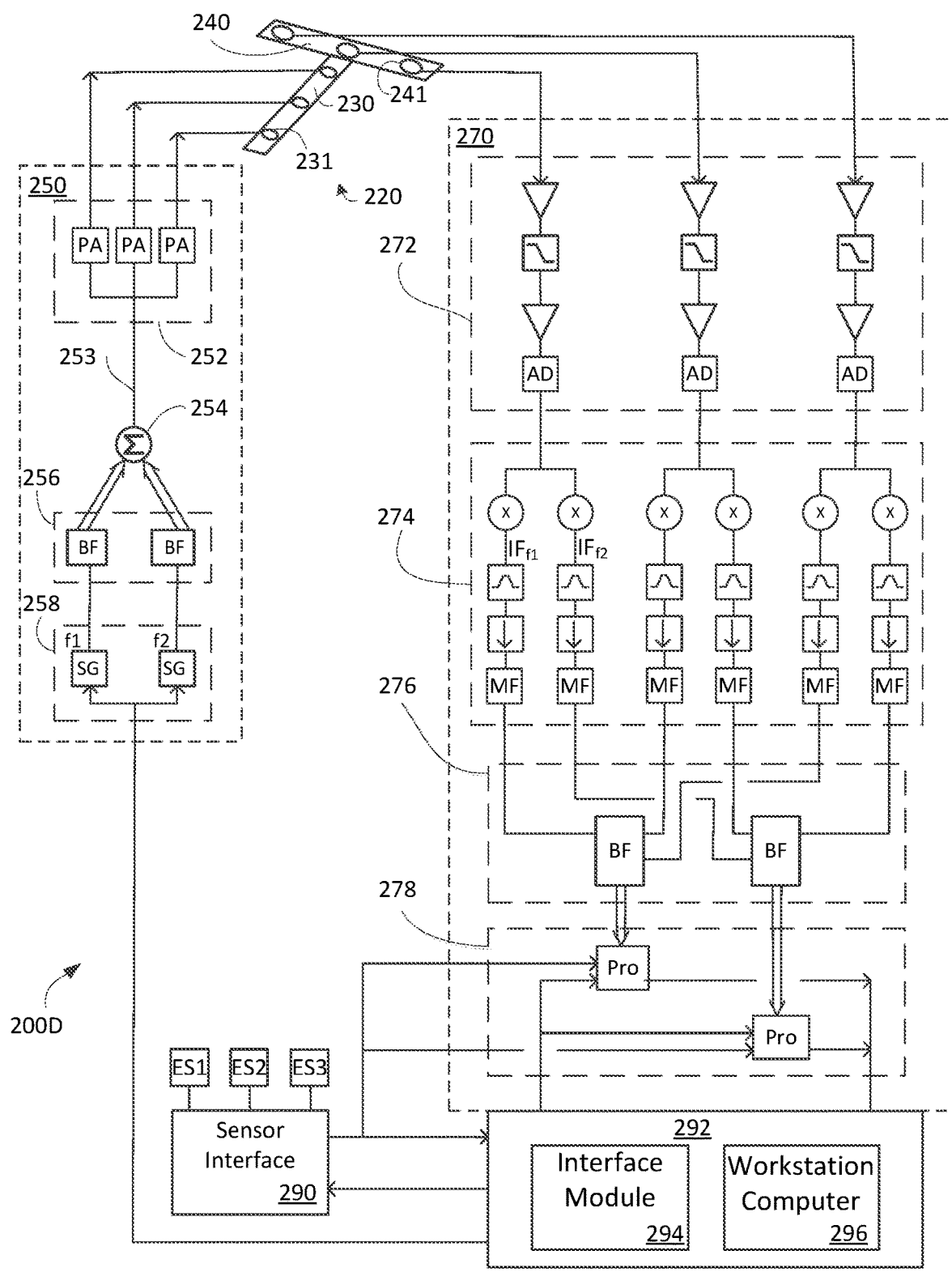
FIG. 2D shows a multispectral survey system 200D.

FIG. 2D shows a multispectral survey system 200D. The echo sounder system includes a transducer section 220, a transmitter section 250, and a receiver section 270. Some embodiments include an interface section 290 and/or a management section 292.

Notably, N may vary from 2 to the number of different center frequencies to be transmitted. In the embodiment shown, N=2, so a message 253 incorporating first and second signals $S_{cf1}$, $S_{cf2}$ at first and second different center frequencies f1, f2 is used to excite three projectors in a projector array. A receiver having three hardware pipelines and six software pipelines is used to process T hydrophone signals for recovery of echo information specific to each of N frequencies. Note that T is the number of hydrophones and that here, T=3.

The transmitter section 250 is for exciting the projector array 230. The section includes a signal generator block 258, a transmit beamformer block 256, a summation block 254, and a power amplifier block 252.

In the signal generator block 258, N signal generators are shown operating at different user selectable center frequencies f1, f2. In respective beamformers of the beamformer block 256, multiple beams are generated from each signal. In a summation block 254, the beams are combined to produce a summation block output signal 253.

The transducer block 220 includes a projector array 230 and a hydrophone array 240 arranged as a Mills Cross. As shown, there are three projectors 231 in the projector array and three hydrophones 241 in the hydrophone array. In the power amplifier block 252, the summed signal or message 253 is an input to power amplifiers driving respective projectors.

Applicant notes that for convenience of illustration, the projector and hydrophone counts are limited to three. As skilled artisans will appreciate, Mills Cross arrays need not have equal numbers of projectors and hydrophones nor do the quantities of either of these transducers need to be limited to three. For example, a modern multibeam echo sounder might utilize 1 to 96 or more projectors and 64 to 256 or more hydrophones.

The array of T hydrophones 241 is for receiving echoes resulting from the acoustic/pressure waves originating from the projector array 230. The resulting hydrophone signals are processed in the receiver section 270 which includes a hardware pipeline block 272, a software pipeline block 274, a receive beamformer block 276, and a processor block 278.

In the hardware pipelines block 272, each of T hardware pipelines processes a respective hydrophone 241 signal through analog components including an analog-to-digital converter. In the embodiment shown, a hardware pipeline provides sequential signal processing through a first amplifier, an anti-aliasing filter such as a low pass anti-aliasing filter, a second amplifier, and an analog-to-digital converter.

In the software pipelines block 274, each of the T hardware pipeline outputs is processed through N software pipelines with downconversion and matched filtering. In the embodiment shown, a software pipeline provides sequential signal processing through a mixer (oscillator is not shown for clarity), a bandpass filter, a decimator, and a matched filter. Communications may occur via communications links between any of the processor block 278, the signal generator block 258, the hardware pipelines block 272, the software pipelines block 274, the and the beamformer block 276. See for example FIG. 2D.

In the receive beamformer block 276, each of N beamformers processes signals. As such, three software pipeline outputs at a first center frequency are processed by a first beamformer and three software pipeline outputs at a second center frequency are processed by a second beamformer. Notably, beamformers may be implemented in hardware or software. For example, multiple beamformers may be implemented in one or more field programmable gate arrays ("FPGA").

In the processor block 278, each of N processors are for processing respective beamformer outputs. Here, a first plurality of beams generated by the first beamformer is processed in a first processor and a second plurality of beams generated by the second beamformer is processed in a second processor. Processor outputs interconnect with a management section 292. Notably, one or more processors may be implemented in a single device such as a single digital signal processor ("DSP") or in multiple devices such as multiple digital signal processors.

Complementary data may be provided via a sensor interface section 290 that is interfaced with a plurality of sensors ES1, ES2, ES3. The sensor interface module may provide sensor data to management section 292 and/or to processors in the processor block 278.

In an embodiment, management section 292 and sensor interface section 290 are provided. The management section includes an interface module 294 and/or a workstation computer 296. The sensor interface section provides for interfacing signals from one or more sensors ES1, ES2, ES3 such as sensors for time (e.g. GPS), motion, attitude, and sound speed.

The management section 292 includes a sonar interface 294 and/or a workstation computer 296. In various embodiments control signals from the management block 292 are used for one or more of making power amplifier block 252 settings (e.g., for array shading), controlling transmit 256 and receive 276 beamformers, selecting software pipeline block 274 operating frequencies, setting set signal generator block 258 operating frequencies, and providing processor block 278 operating instructions.

As shown in FIG. 2D above, the projectors are driven by a signal at discrete frequencies. Returns received by the hydrophones are mixed with respective oscillator signals and the signals, for example the difference signals, are passed through respective band pass and matched filters.

Hyperspectral Sonar Systems

Figure 3A:
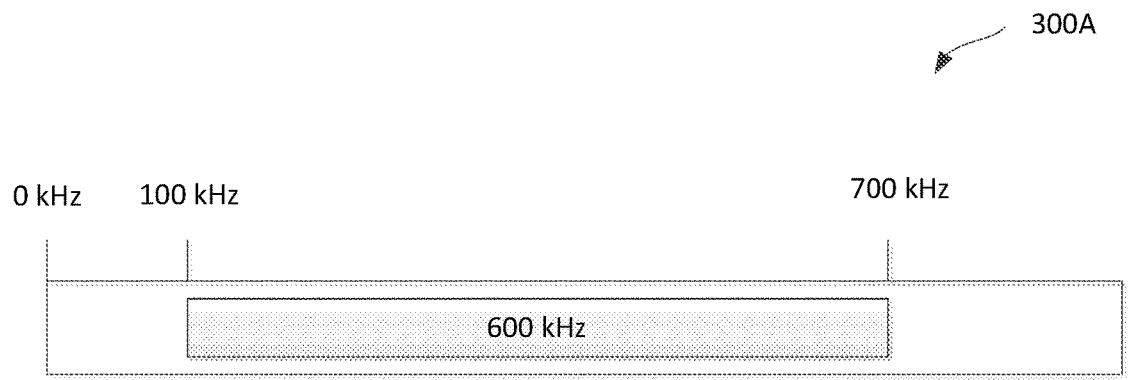
FIGS. 3A-C show hyperspectral messages and frequencies of interest 300A-C.

FIG. 3A shows a hyperspectral broadband signal 300A. As seen, the bandwidth of the signal is from 100 to 700 kHz, a range of 600 kHz.

Referring again to the transducers of FIG. 1 103, 107, these projectors and hydrophones have a much wider and higher operating band than that used by conventional sonar systems that may also use broadband waveforms. In particular, these projectors and hydrophones may operate in a frequency range of 20 to 1000 kHz. Furthermore, the spacing of transducer elements in the transmit and receive arrays is selected to allow beams to be formed with 1-degree resolution.

Figure 3B:
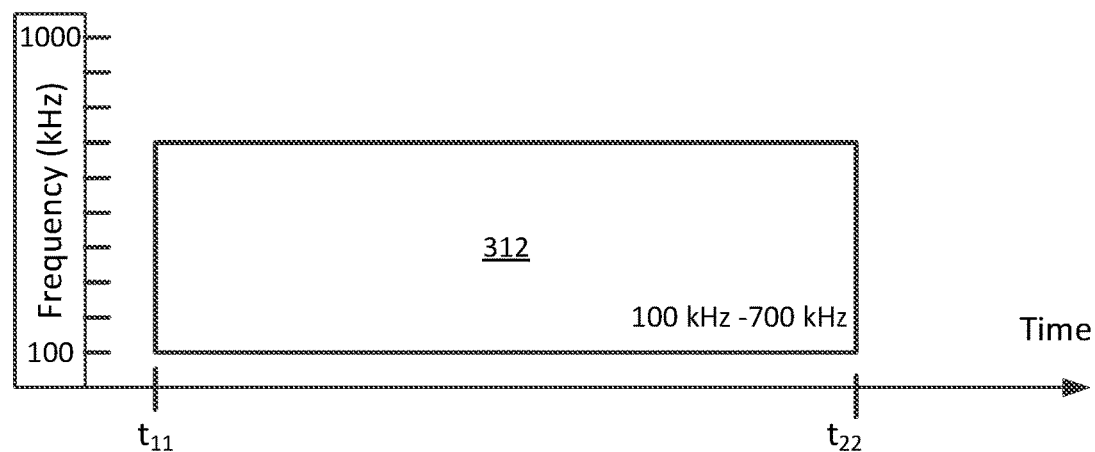

FIG. 3B shows the hyperspectral signal of FIG. 3A used to ensonify a target 300B. In operation, the hyperspectral sonar ensonifies a target with this signal such that the target is excited with all of the frequencies in the band 100 to 700 kHz during time span t11-t22.

Figure 3C:
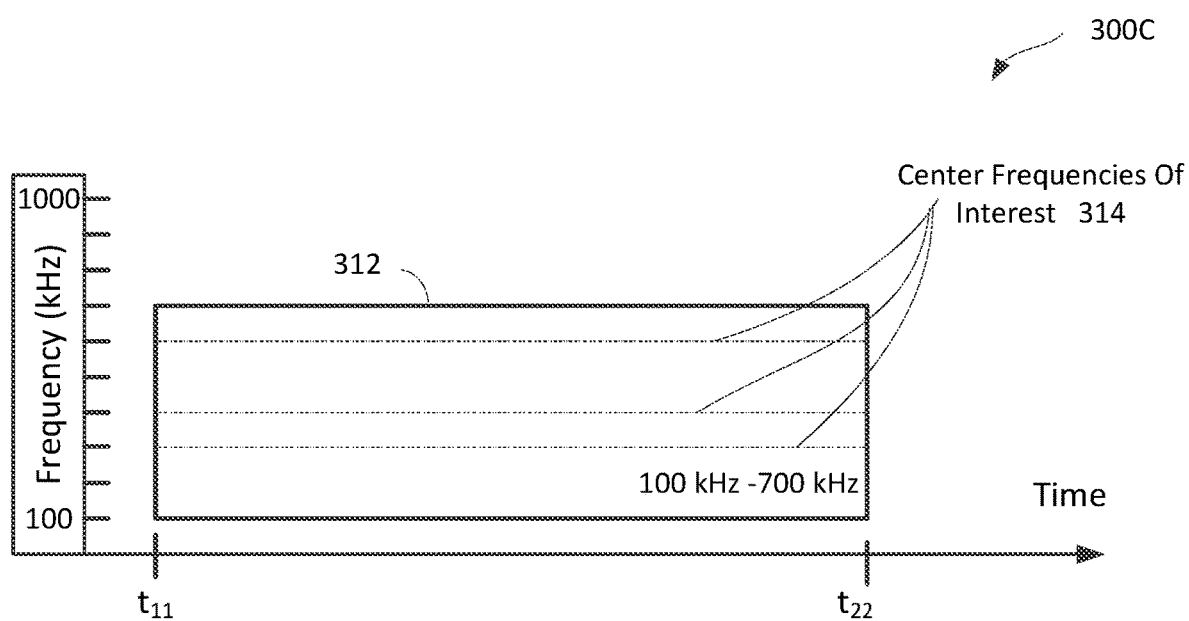

FIG. 3C shows the hyperspectral signal of FIG. 3B and exemplary center frequencies of interest 314 (300 kHz, 400 kHz, 600 kHz). Notably, with hyperspectral sonar the center frequencies of interest can be chosen after the data are acquired because data for all of the frequencies in the band are returned.

If the available bandwidth of the sonar equipment is less than that needed for the hyperspectral signal, the sonar may be adapted by aggregating bands. FIGS. 4A-D below illustrate the case of adequate sonar equipment bandwidth while FIGS. 4E-H illustrate the case of aggregated bands to accommodate limited bandwidth.

Hyperspectral Sonar, No Bandwidth Limitation

Figure 4A:
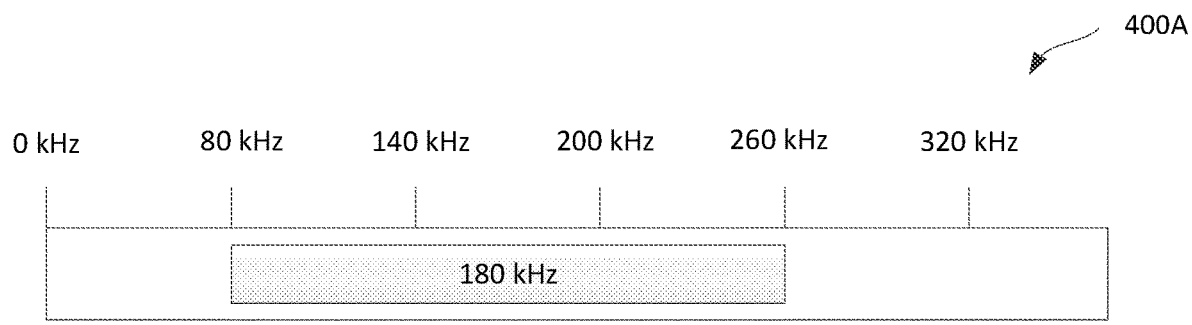
FIGS. 4A-B show hyperspectral messages in an 80 to 260 kHz band 400A-B.

FIG. 4A shows a hyperspectral broadband signal 400A. As seen, the bandwidth of the signal is from 80 to 260 kHz, a range of 180 kHz.

Figure 4B:
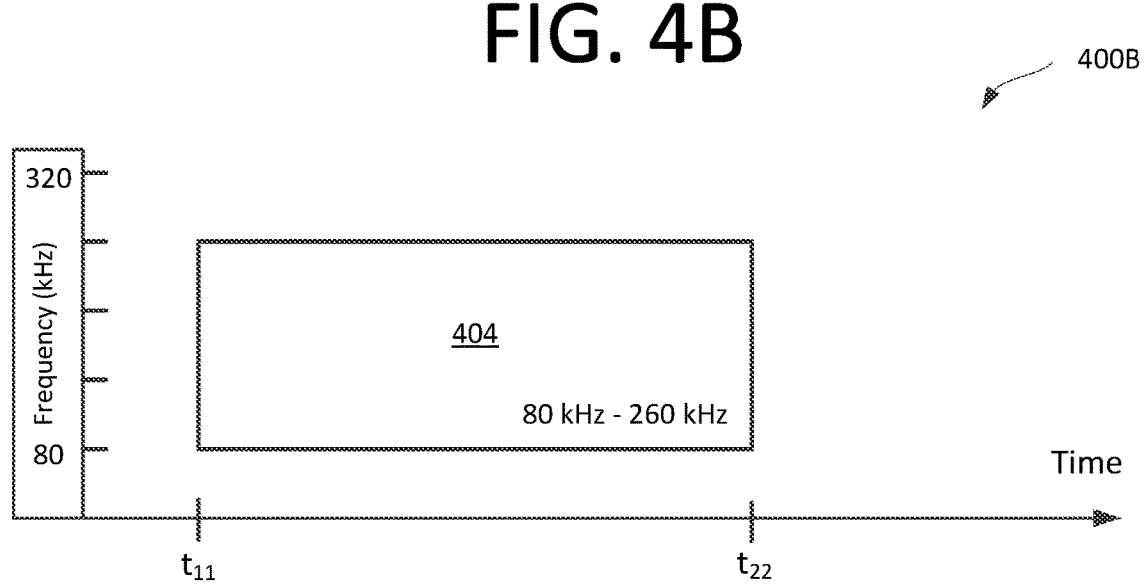

FIG. 4B shows the hyperspectral signal of FIG. 4A used to ensonify a target 400B. In operation, the hyperspectral sonar signal 404 ensonifies a target such that the target is excited by all of the frequencies in the band 80 to 260 kHz during time span t11-t22.

Figure 4C:
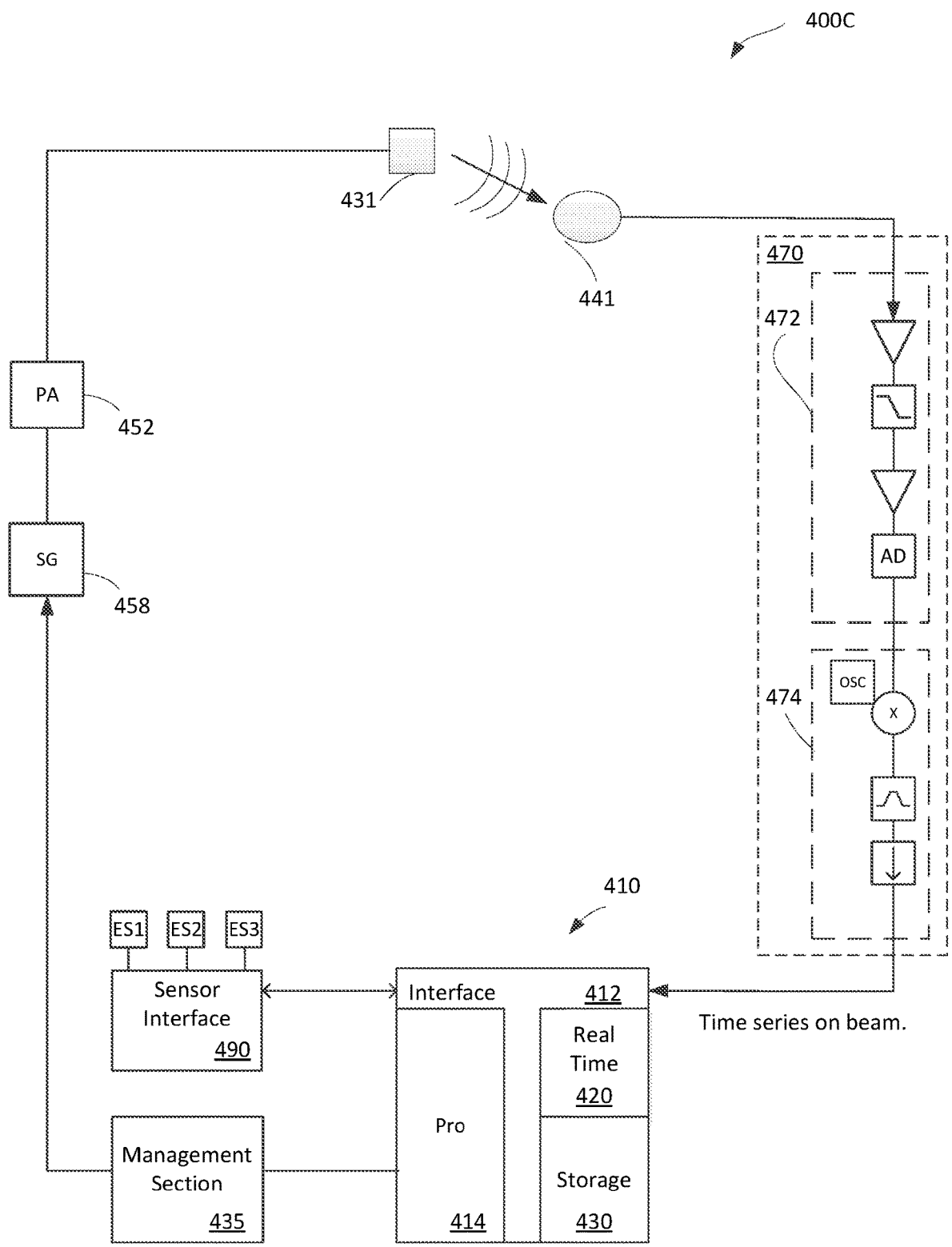
FIGS. 4C-D show hyperspectral survey systems 400C-D.

FIG. 4C shows an embodiment including a single beam hyperspectral sonar system 400C. The sonar system includes a signal generator 458 for constructing a message that is delivered to an amplifier 452 and thereafter to a projector 431. Returns from the message are picked up by a hydrophone 441 and processed. The projector and hydrophone may comprise an integral unit. There may be one or several projectors and/or hydrophones, and one transducer may act as both a projector and a hydrophone.

Processing occurs in a processing pipeline 470. The processing pipeline includes a first pipeline block 472 which may be hardware or software and a second pipeline block 474 which may be hardware or software. In an embodiment, the first block includes hardware and in an embodiment the second block includes software. In an embodiment, the first block consists of hardware and in an embodiment the second block consists of software.

The first pipeline block 472 may include one or more of amplification followed by anti-aliasing which is again followed by amplification and analog to digital conversion.

The second pipeline block 474 may include one or more of mixing followed by bandpass filtering followed by decimation. An oscillator may be connected with the mixer as shown. The first pipeline block 472 feeds the second pipeline block 474 which feeds facilities for processing and storage 410 at interface 412. In various embodiments, the processing and storage facility receives a beam time series via the pipelines.

The processing and storage facilities 410 may include processing, storage, or processing and storage. Processing of the second pipeline 474 output may precede storage. Storage may include the beam time series or data derived from the beam time series. In various embodiments, the storage provides a means to examine the returns at any frequency within the band encompassed by the broadband message emitted by the projector 431.

As shown, the processing and storage facility 410 may include any of a processor 414, a real time output 420, and a storage section 430. In an embodiment, the processing and storage facility interface 412 receives the output of the second pipeline block 474 and may exchange signals with a sensor interface 490. The sensor interface section provides for interfacing signals from one or more sensors ES1, ES2, ES3 such as sensors for time (e.g. GPS), motion, attitude, and sound speed.

In the processor block 414 calculations may be performed including calculations measuring round trip travel time for the acoustic signal emitted by the projector 431. Processor outputs may interconnect with a management section 435. Notably, one or more processors may be implemented in a single device such as a single digital signal processor ("DSP") or in multiple devices such as multiple digital signal processors.

The management section 435 may include a sonar interface and a workstation computer. In various embodiments control signals from the management section are used for one or more of making power amplifier block 452 settings, selecting software pipeline block 474 operating frequencies, setting signal generator block 458 broadband message particulars, generating signals 458, and providing processing and storage facility 410 instructions. In various embodiments the processor block 414 and management section 435 may share processors.

Figure 4D:
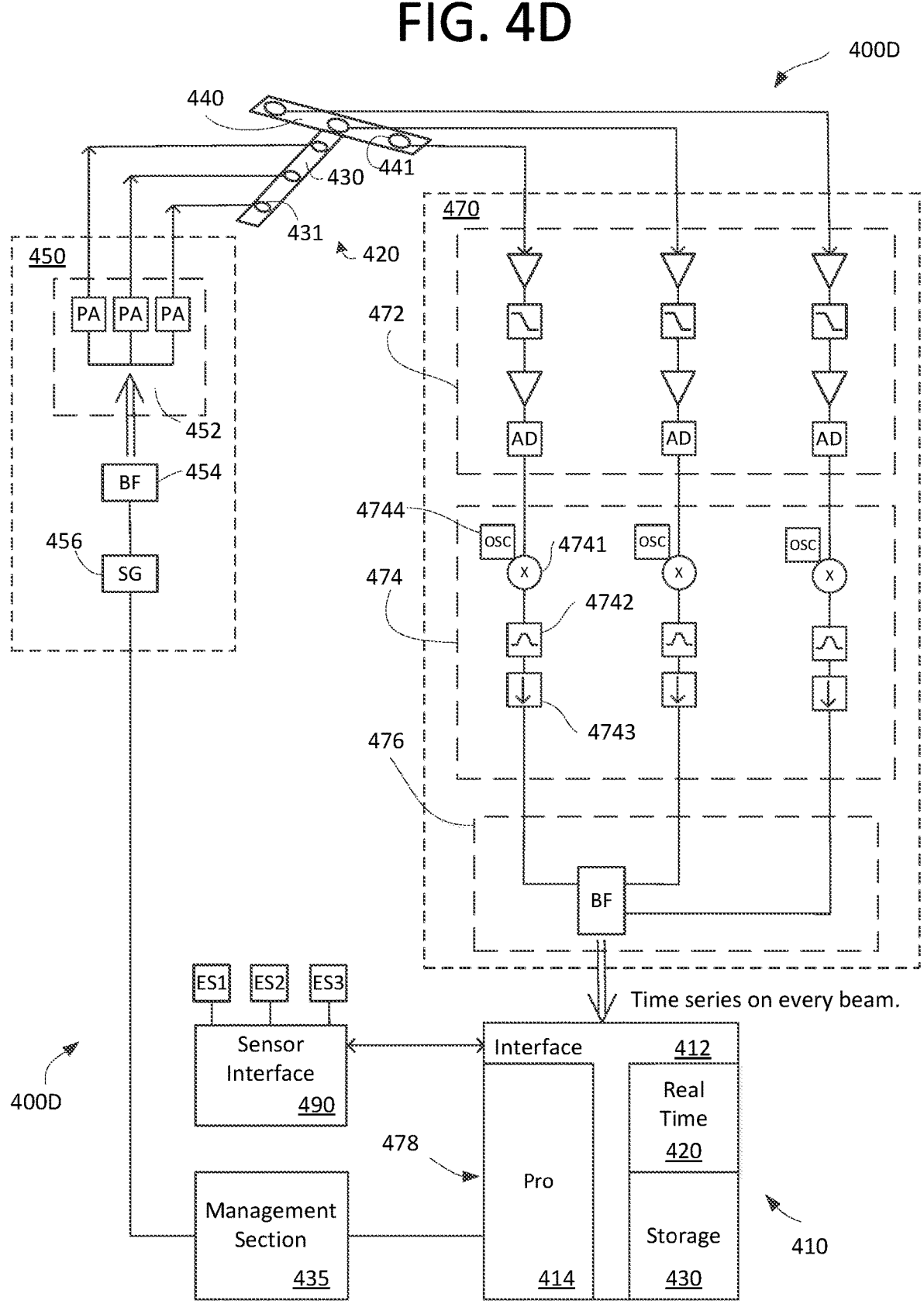

FIG. 4D shows an embodiment including a multibeam hyperspectral sonar system 400D. While this sonar system is similar to the multispectral sonar system described above, there are important differences. Differences include changes made in the transmitter section 450, the second pipeline block 474, in the beam forming section 476, and in the processor section 478.

In the transmitter section, a single broadband signal is generated 456. This signal is subsequently passed through a beam former 454. The beam former output or a signal derived therefrom is amplified in power amplifier(s) 452. For example, three projectors are shown and each projector is driven by a respective power amplifier.

In the second pipeline block 474, a first difference is the elimination of matched filters. A second difference is the elimination of the multispectral aspect that provided for each hydrophone two mixing/filtering sections to handle returns from a transmitted multispectral message including content at a first frequency and content at a second frequency. In the drawing, a mixer 4741 is followed by a notch filter 4742 and a down converter 4743. An oscillator is for use with each of the mixers 4744. In an embodiment, each pipeline has an oscillator and the oscillator may provide a common oscillator frequency to each mixer. In an embodiment, the oscillator signal is provided by a common oscillator.

In the beam forming section 476, two beam formers were required where the multispectral system transmitted a message with two different frequency components. However, in the hyperspectral system only a single beam former is required to process returns from a broadband message.

In the processing and storage facility 410, a signal interface 412 receives the beam former output and may be interconnected with one or more of a processor 414, a real time unit 420 and a storage unit 430.

Complementary data may be provided via the interface 412. For example, a sensor interface section 490 may provide for interconnection with a plurality of sensors ES1, ES2, ES3. Sensors may include sensors for time, motion, altitude, and sound speed.

In some embodiments, a management section 435 is provided. The management section may include a sonar interface and/or a workstation computer. In various embodiments control signals from the management section are used for one or more of making power amplifier block 452 settings (e.g., for array shading), controlling transmit 454 and receive 476 beamformers, selecting software pipeline block 474 operating frequencies (where broadband signals are subdivided), setting signal generator block 456 signal particulars including a start frequency and bandwidth, and providing processor block 478 operating instructions.

As shown in FIG. 4D above, the projectors are driven by a single broadband source. Returns received by the hydrophones are mixed with respective oscillator signals and the signals are passed through respective band pass filters before reaching the beamformer. No matched filters are used.

Hyperspectral Sonar, Bandwidth Limited

Figure 4E:
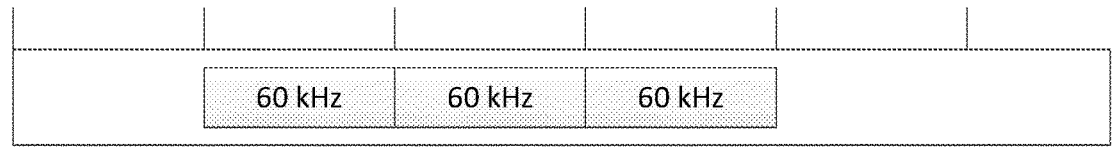
FIGS. 4E-G show hyperspectral messages and sub-bands 400E-G.

FIG. 4E shows a hyperspectral broadband signal 400E. As seen, the bandwidth of the signal is from 80 to 260 kHz, a range of 180 kHz. But, as seen this bandwidth is divided into three 60 kHz sub-bands.

Figure 4F:
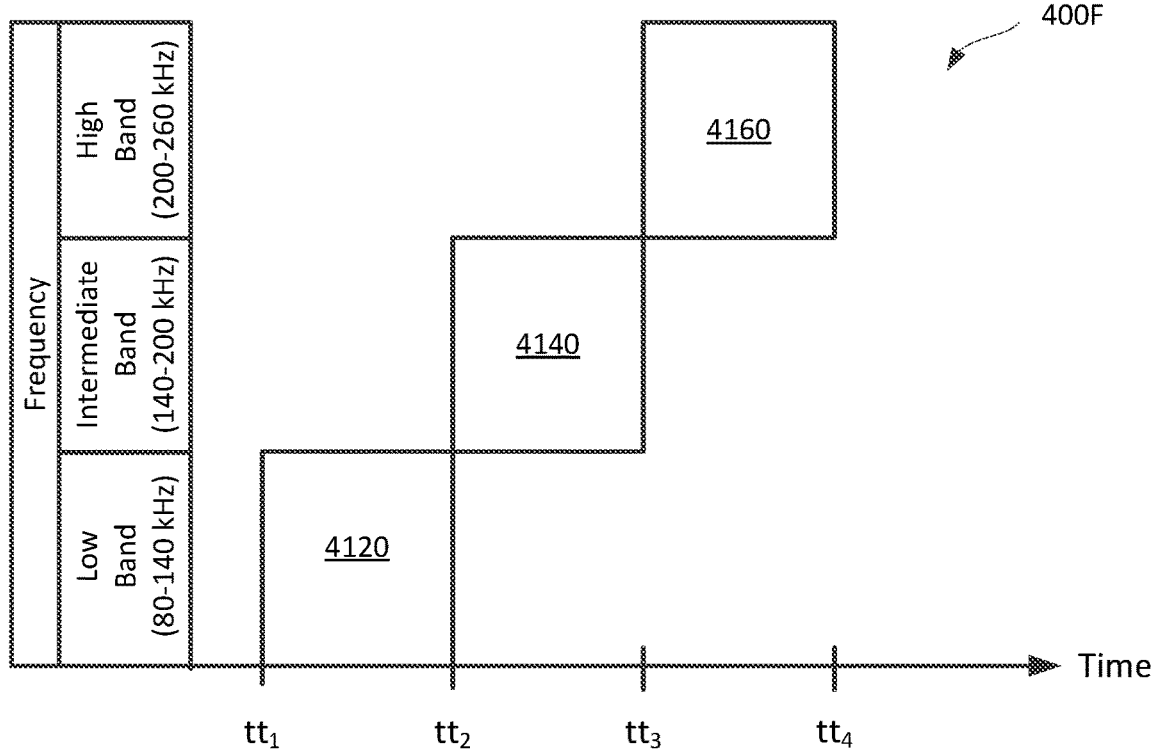

FIG. 4F shows a serial hyperspectral signal 400F incorporated in a message. A low band 4120 of 60 kHz adjoins an intermediate band 4140 of 60 kHz which adjoins a high band 4160 of 60 kHz such that the 180 kHz range is covered. As seen, the sub-bands are transmitted in serial fashion with the low band transmitted in time span tt1-tt2, the intermediate band transmitted in time span tt2-tt3 and the high band transmitted in time span tt3-tt4.

Figure 4G:
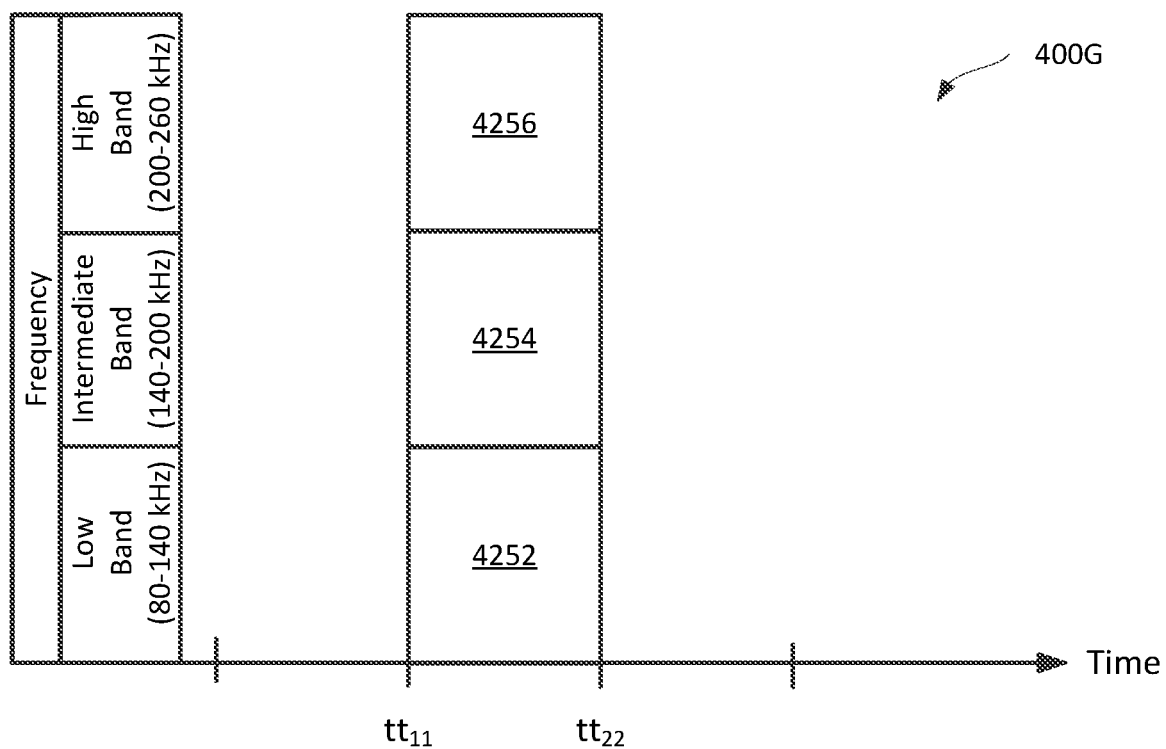

FIG. 4G shows a parallel hyperspectral signal 400G incorporated in a message. A low band 4252 of 60 kHz adjoins an intermediate band 4254 of 60 kHz which adjoins a high band 4256 of 60 kHz such that the 180 kHz range is covered. As seen, the sub-bands are transmitted in parallel fashion in time span tt11-tt22.

Figure 4H:
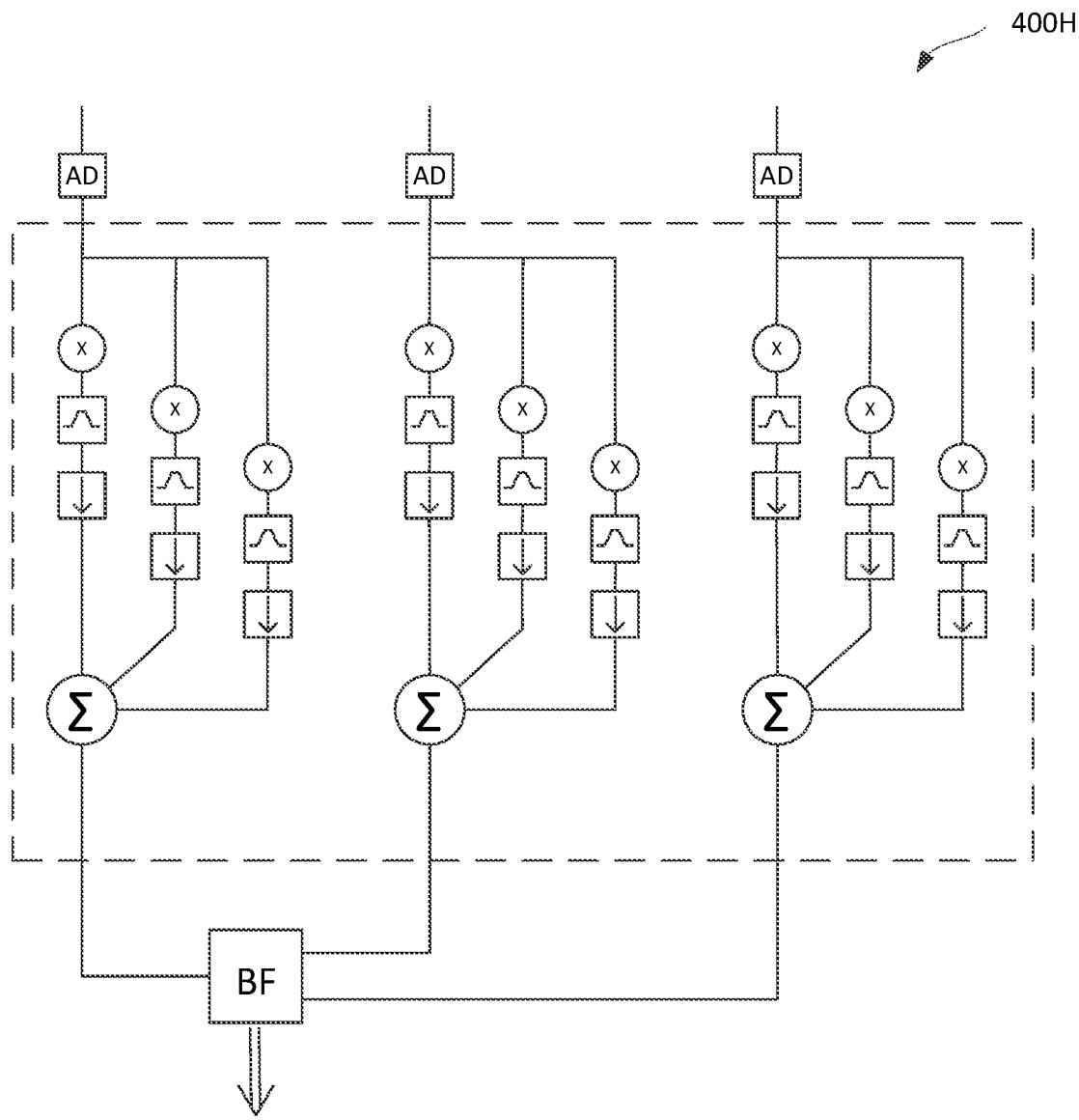
FIG. 4H shows a modification to the survey system of FIG. 4D enabling operation with sub-bands 400H.

FIG. 4H shows a modification 400H to the multibeam hyperspectral sonar system of FIG. 4D that accommodates sub-bands. As seen, the analog to digital converter outputs are passed to branches that are filtered via bandpass filters to accommodate each of the sub-bands. Notably, each branch includes a mixer, a bandpass filter, and a down converter. Oscillators interconnected with the mixers are omitted for clarity.

In this example, there are three sub-bands. Therefore, each analog to digital converter feeds three branches. And, each branch has a bandpass filter that selects a sub-band. Bandpass filters are therefore provided for 80 to 140 kHz, for 140 to 200 kHz, and for 200 to 260 kHz.

After processing in the branches, the output of each analog to digital converter is summed. The summed outputs are then passed to the beamformer.

Figure 5:
FIG. 5 shows hyperspectral mission types 500.

FIG. 5 shows a mission table 500. Bottom missions may include bottom classification and/or segmentation, sub-bottom classification and/or segmentation, and improved bottom detection. Other missions may include water column classification and/or segmentation, and object classification. All of these missions may be carried out with broadband messages including either of frequency modulation (FM), noise-like, click, or click train signals.

Bottom classification involves partitioning acoustic returns from the seafloor into discrete groups associated with various sediment or bottom types. Variations in backscatter strength from multiple narrowband frequencies are used to construct a feature set representing sea floor response versus frequency or versus frequency and incident angle. (It should be noted that there is an upper frequency above which backscatter strength ceases to vary with frequency.) These features can then be used independently to segment bottom types or they can be correlated to expected responses from known sediment types in attempts to characterize the sea floor.

During a bottom classification and/or segmentation mission, a broadband message in the range of 20 to 800 kHz may be used. This message may have a bandwidth of 100 kHz or greater.

Sub-bottom classification is similar to bottom classification in its use of variations in acoustic returns from multiple narrowband frequencies to characterize sea floor types, but its use of lower frequency sounds allows acoustic penetration into the sea floor. Sub-surface classification can characterize sediment types, rocks, or fluids beneath the sea floor.

During a sub-bottom classification and/or segmentation mission, the message frequency will tend toward the lower end of the frequency range. A broadband message in the range of 20 to 100 kHz may be used. This message may have a bandwidth of 40 kHz or less.

During an improved bottom detection mission, a broadband message in the range of 20 to 800 kHz may be used. This message may have a bandwidth of 100 kHz or greater. Dominant or predictable clutter frequencies can be ignored in favor of those with high backscatter strength from a known bottom type.

Water column classification is a method for detecting and identifying aspects of the marine environment between the ocean surface and sea floor. Naturally occurring content in the water column can include animals, plants, dust, and bubbles. Frequency-dependent features of the acoustic backscatter from these objects can be used to identify or infer properties of the features causing the backscatter.

During a water column classification and/or segmentation mission, a broadband message in the range of 20 to 800 kHz may be used. The message may have a bandwidth of 100 kHz or greater.

During a mission to classify objects, for example manmade objects from natural clutter objects, sonar resolution may be insufficient for classification.

In such cases, variations in target response from different narrowband frequencies can be provided to automated clustering, segmentation, or classification applications.

During an object classification mission, a broadband message in the range of 20 to 800 kHz may be used. The message may have a bandwidth of 100 kHz or greater. The message may have a bandwidth of 100 kHz or greater.

Figure 6A:
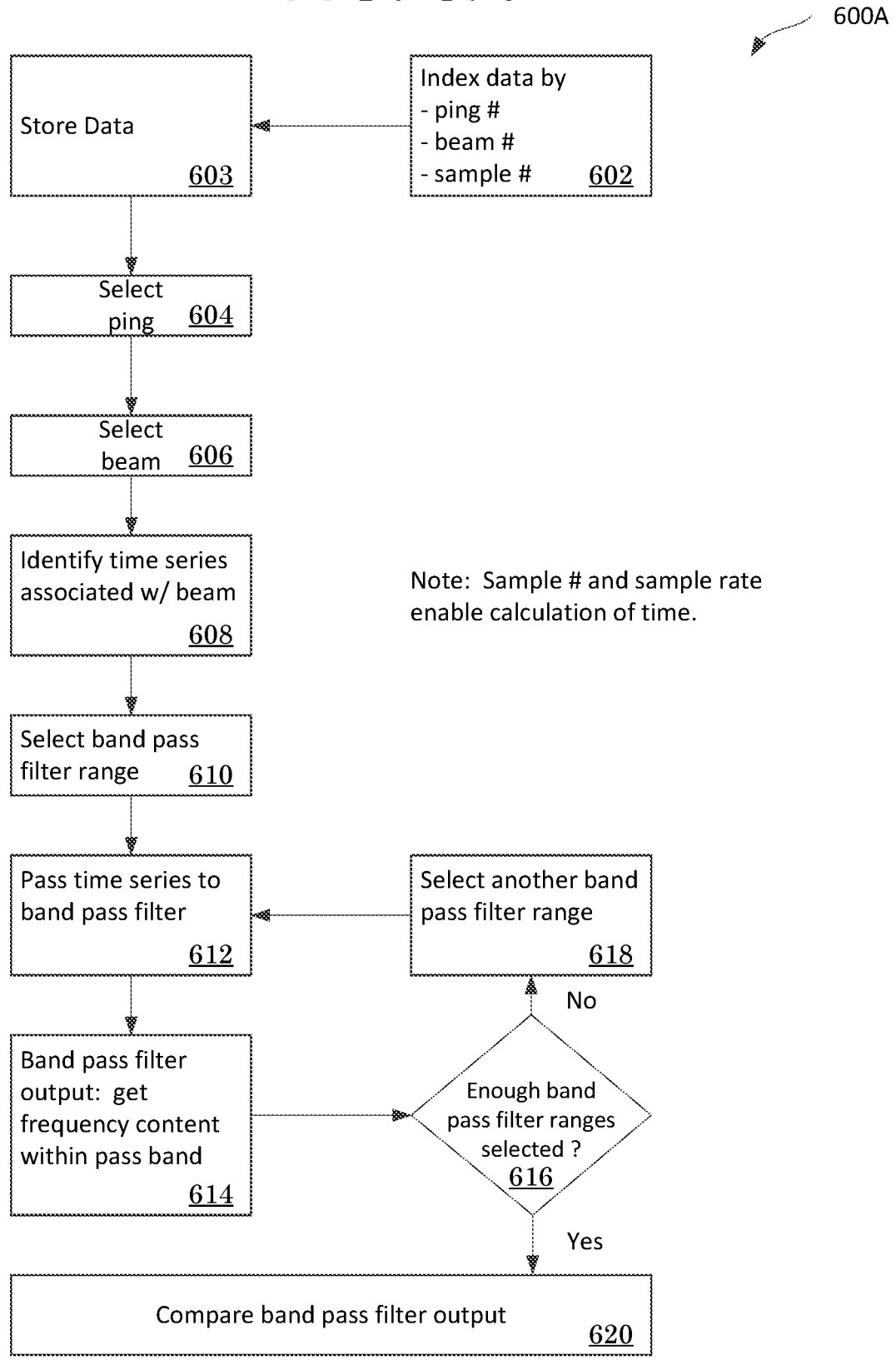
FIG. 6A shows a hyperspectral survey process using band pass filters 600A.

FIG. 6A shows a hyperspectral sonar method using band pass filters 600A. In a first step, data acquired by the sonar system including one or more acoustic returns are indexed by ping number, by beam number, and by sample number 602.

In a second step 603 the data are stored. The data may be used contemporaneously or the data may be used at a later time, for example to evaluate the strength of the returns at various frequencies.

In a third step, a particular ping is selected 604. In a fourth step, a particular beam is selected 606. In a fifth step, the time series associated with the particular beam is identified 608.

In a sixth step, a band pass filter range is selected 610. In a seventh step, the time series is passed through the band pass filter 612. In an eight step 614, the band pass filter output is the frequency content within the pass band.

Notably, the width of the band pass filter may be a fraction of the center frequency. For example, the width of the band pass filter may be 10% of the center frequency. For example, the width of the band pass filter may be 1%, 2%, 3%, 4%, 5%, 6%, 7%, 8% or 9% of the center frequency. In an embodiment, the width of the band pass filter is 2 kHz or between 2 and 10 kHz.

In a ninth step, a query asks if enough band pass filter ranges have been selected 616. If so, the process subsequently compares band pass filter outputs in step 620. If not, the process selects another band pass filter range 618 and subsequently moves to step 612.

Figure 6B:
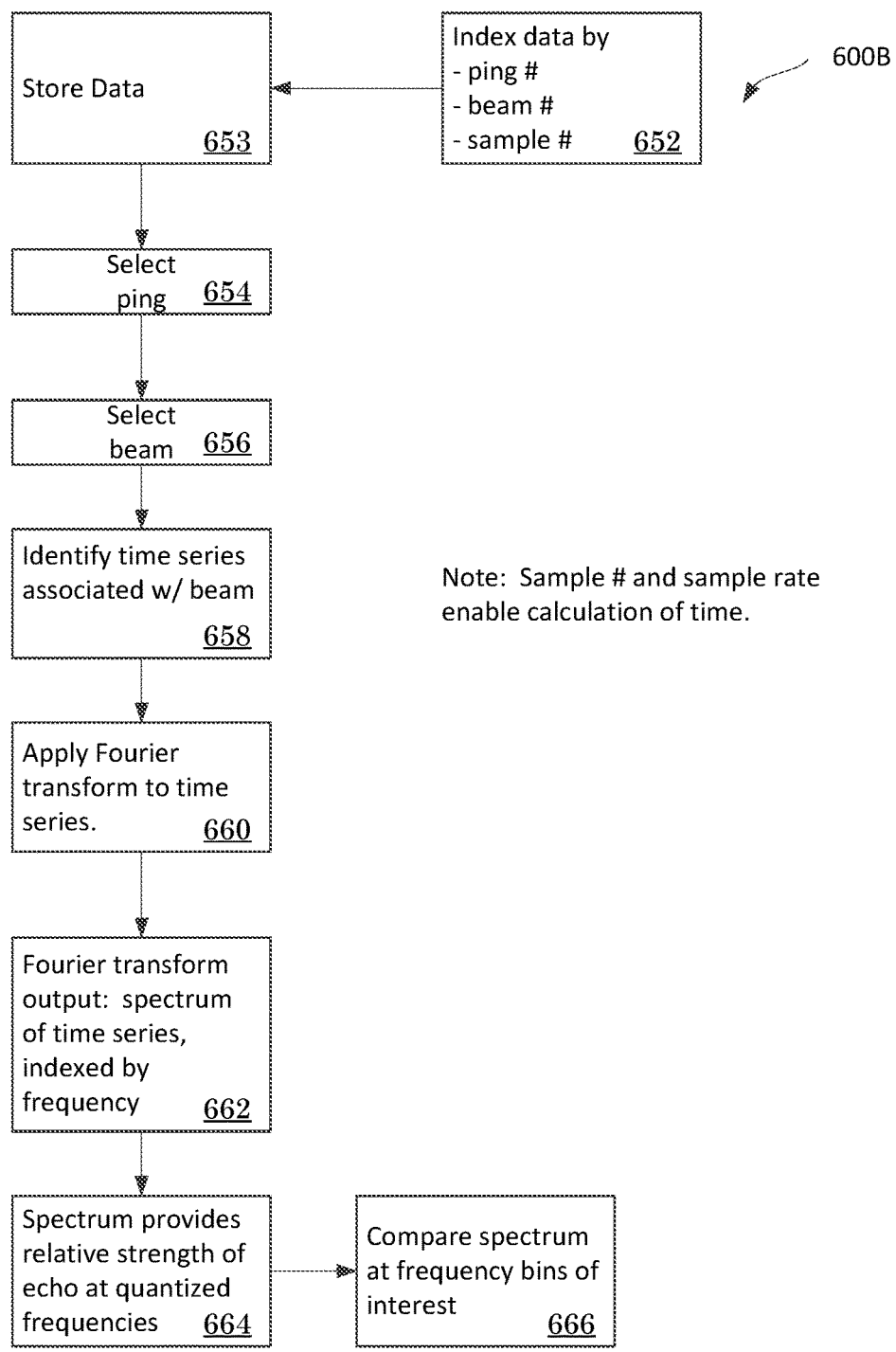
FIG. 6B shows a hyperspectral survey process using Fourier analysis 600B.

FIG. 6B shows a hyperspectral sonar method using Fourier Transforms 600B. In a first step, data acquired by the sonar system including one or more of acoustic returns or travel times is indexed by ping number, by beam number, and by sample number 652.

In a second step 653 the data are stored. The data may be used contemporaneously or the data may be used at a later time, for example to evaluate the strength of the returns at various frequencies.

In a third step a particular ping is selected 654. In a fourth step, a particular beam is selected 656. In a fifth step, the time series associated with the particular beam is identified 658.

In a sixth step, a Fourier transform or fast Fourier transform is used to process the time series 660. In a seventh step the Fourier transform output is a spectrum of the time series indexed by frequency 662.

In an eighth step, the spectrum provides the relative strength of the echo at each of multiple quantized frequencies 664. In a ninth step, the spectrum at the frequency bins of interest are compared 666.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A sonar vertical survey system comprising:
a broadband multibeam echo sounder system that avoids the use of matched filters, the system for installation on a water going vehicle;
an acoustic transceiver connected with plural transducers in a single linear transmit array arranged orthogonally with respect to plural transducers in a single linear receive array to form a Mills Cross;
the transceiver synthesizing a broadband transmitter waveform including a frequency modulated (FM), noise-like, click, or click train waveform with a center frequency between 20 kHz and 1000 kHz;
the transceiver operating within a band having a bandwidth of 100 kHz or more;
the broadband waveform exciting all frequencies within the band using the transmit array such that a 180-degree or smaller swath of a waterbody bottom or water column is ensonified by the waveform;
the receive array receives a waveform echo from ensonified scattering centers;
wherein data corresponding to the receive array returns are stored;
wherein band pass filters or Fourier transforms are applied to the stored data for mathematical analysis to produce filtered subsets or transformed subsets; and,
wherein a mathematical comparison is performed on at least two of the filtered subsets or transformed subsets and the results or information derived from the results of said mathematical comparison is available for subsequent use.

2. The sonar vertical system of claim 1 wherein the system forms beams with 1°×1° or better resolution.

3. The vertical survey system of claim 1 further comprising:
transceiver receiver signals processed in a first pipeline block, a second pipeline block and a receiver beam former;
in the first pipeline block processing includes amplification, anti-aliasing and analog to digital conversion; and,
in the second pipeline block processing includes mixing, bandpass filtering and decimation.

4. The vertical survey system of claim 1 wherein the broadband waveform has a bandwidth that is more than 10% of its center frequency.

5. The vertical survey system of claim 1 wherein the broadband waveform produces a statistically significant difference between an acoustic return from a target excited by a first frequency in the band and an acoustic return from the target excited by a second frequency in the band.

6. The vertical survey system of claim 1 wherein the mathematical analysis includes mathematical analysis of a first signal with a first backscatter strength and mathematical analysis of a second signal with a second backscatter strength where the difference between the backscatter strengths is 2 dB or more.

7. The vertical survey system of claim 1 wherein the mathematical comparison includes use of band pass filter outputs to assess the strength of echo returns at particular frequencies.

8. A method of assessing the strength of echo returns at particular frequencies, the method comprising the steps of:
acquiring multibeam sonar data by transmitting broadband waveforms and receiving resulting echoes from ensonified scattering centers using a Mills cross transducer arrangement;
indexing the data by ping number, beam number, and sample number;
storing, now or later, the multibeam sonar data;
selecting a ping and selecting a beam of the ping;
processing the beam without the use of matched filters to (i) identify a time series associated with the beam, (ii) obtain from a Fourier transform output a spectrum of the time series indexed by frequency, and (iii) via the spectrum, determine a relative strength of the echo at each of the multiple quantized frequencies;
where relative strengths dependent on more than one beam are desired, repeat the processing step for each beam; and,
at two or more quantized frequencies, mathematically comparing the relative strengths to enable bottom segmentation or characterization.

9. The method of claim 8 wherein the broadband waveform is in a frequency band with a bandwidth that is more than 10% of its center frequency.

10. The method of claim 8 wherein the broadband waveform produces a statistically significant difference between an acoustic return from a target excited by a first frequency in the band and an acoustic return from the target excited by a second frequency in the band.

11. The method of claim 8 wherein the mathematical analysis includes mathematical analysis of a first signal with a first backscatter strength and mathematical analysis of a second signal with a second backscatter strength where the difference between the backscatter strengths is 2 dB or more.

12. A method of bottom classification comprising the steps of:

providing a sonar transceiver for transmitting acoustic waveforms and for receiving echoes resulting from the transmitted waveforms wherein the waveforms are transmitted by a linear transmit array and the echoes are received by a linear receive array where the arrays are in a Mills cross arrangement;

acquiring multibeam sonar data when transmitted broadband waveforms result in received echoes that are processed in the transceiver without the aid of matched filters;

wherein the waveforms are transmitted at a center frequency of 20 kHz to 1000 kHz with a bandwidth of 100 kHz or more and during post processing seafloor acoustic returns are partitioned into discrete groups associated with similar bottom types; and, wherein adjusted for incidence angle, data indicating similar backscatter strengths at particular frequencies determines similar bottom types.

13. The method of claim 12 wherein the waveform has a bandwidth that is more than 10% of its center frequency.

14. The method of claim 12 wherein the broadband waveform produces a statistically significant difference between an acoustic return from a target excited by a first frequency in the band and an acoustic return from the target excited by a second frequency in the band.

15. The method of claim 12 wherein the mathematical analysis includes mathematical analysis of a first signal with a first backscatter strength and mathematical analysis of a second signal with a second backscatter strength where the difference between the backscatter strengths is 2 dB or more.

16. The method of claim 12 wherein the mathematical comparison includes use of band pass filter outputs to assess the strength of echo returns at particular frequencies.

17. The method of comparing band pass filter outputs to assess the strength of echo returns at particular frequencies, the method comprising the steps of:

with an acoustic transceiver and a Mills cross transducer arrangement, transmitting broadband sonar waveforms and receiving resulting scattering center echo data;

indexing the data by ping number, beam number, and sample number;

storing, now or later, the received sonar data;

selecting a ping and selecting a beam of the ping;

processing the beam without the use of matched filters to (i) identify a time series associated with the beam, (ii) select a band pass filter, and (iii) pass the time series to the band pass filter;

repeating the processing step for n>1 frequencies where the selected band pass filter is one of plural bandpass filters centered at a discrete frequency $f_i$ which need not match the frequency of the transmitted waveform;

where band pass filter outputs dependent on more than one beam are desired, repeat the processing step for each beam; and, comparing mathematically the band pass filter outputs at two or more band pass filter frequencies for bottom segmentation or characterization purposes.

18. The method of claim 17 wherein the broadband waveform is in a frequency band with a bandwidth that is more than 10% of its center frequency.

19. The method of claim 17 wherein the broadband waveform produces a statistically significant difference between an acoustic return from a target excited by a first frequency in the band and an acoustic return from the target excited by a second frequency in the band.

20. The method of claim 17 wherein the mathematical analysis includes mathematical analysis of a first signal with a first backscatter strength and mathematical analysis of a second signal with a second backscatter strength where the difference between the backscatter strengths is 2 dB or more.

* * * * *